(12) United States Patent
Morikawa et al.

(10) Patent No.: US 6,707,577 B1
(45) Date of Patent: Mar. 16, 2004

(54) GRAY SCALE IMAGE PROCESSING APPARATUS AND GRAY SCALE IMAGE PROCESSING METHOD THEREFOR

(75) Inventors: Yukio Morikawa, Kawasaki (JP); Jun Moroo, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/540,489

(22) Filed: Mar. 31, 2000

(30) Foreign Application Priority Data

Apr. 23, 1999 (JP) .......................................... 11-116821

(51) Int. Cl.⁷ .......................... H04N 1/405; H04N 1/409
(52) U.S. Cl. .................... 358/3.03; 358/3.13; 358/3.23; 358/3.26
(58) Field of Search ............................. 358/3.03, 3.13, 358/3.16, 3.17, 3.18, 3.23, 3.26, 466; 382/270, 275

(56) References Cited

U.S. PATENT DOCUMENTS

| | | | | |
|---|---|---|---|---|
| 5,109,282 A | * | 4/1992 | Peli ............................ | 358/3.14 |
| 5,113,264 A | * | 5/1992 | Isono et al. ................ | 358/3.23 |
| 5,638,188 A | * | 6/1997 | Moro et al. ................ | 358/3.03 |
| 5,946,452 A | * | 8/1999 | Spaulding et al. .......... | 358/1.9 |
| 6,025,930 A | * | 2/2000 | Thompson et al. .......... | 358/1.9 |
| 6,288,795 B1 | * | 9/2001 | Urasawa .................... | 358/3.09 |
| 2003/0048479 A1 | * | 3/2003 | Hirano ...................... | 358/3.14 |

FOREIGN PATENT DOCUMENTS

| | | |
|---|---|---|
| JP | 61-173580 | 8/1986 |
| JP | 8-279037 | 10/1996 |

* cited by examiner

*Primary Examiner*—Scott Rogers
(74) *Attorney, Agent, or Firm*—Westerman, Hattori, Daniels & Adrian, LLP

(57) ABSTRACT

A gray scale image processing method which converts an input image, each pixel of which has a value between 0 and N, to an output image, each pixel of which is represented by a gray scale value of A levels. The method has a generation step of generating B reference images, in each of which each pixel is represented by a gray scale value of the A levels, from B elementary images, in each of which all pixels have the same value between 0 and N, using one or more different error distribution matrixes according to said A levels, a selection step of selecting one of the B reference images based on a pixel value f(x,y) of the input image at coordinates (x,y) and an output step of outputting a pixel value represented by a gray scale value of the A levels of the selected one of the B reference images at a position corresponding to the coordinates (x,y).

23 Claims, 13 Drawing Sheets

201  f(x, y)<B 202  f(x, y)=B 203  f(x, y)>B

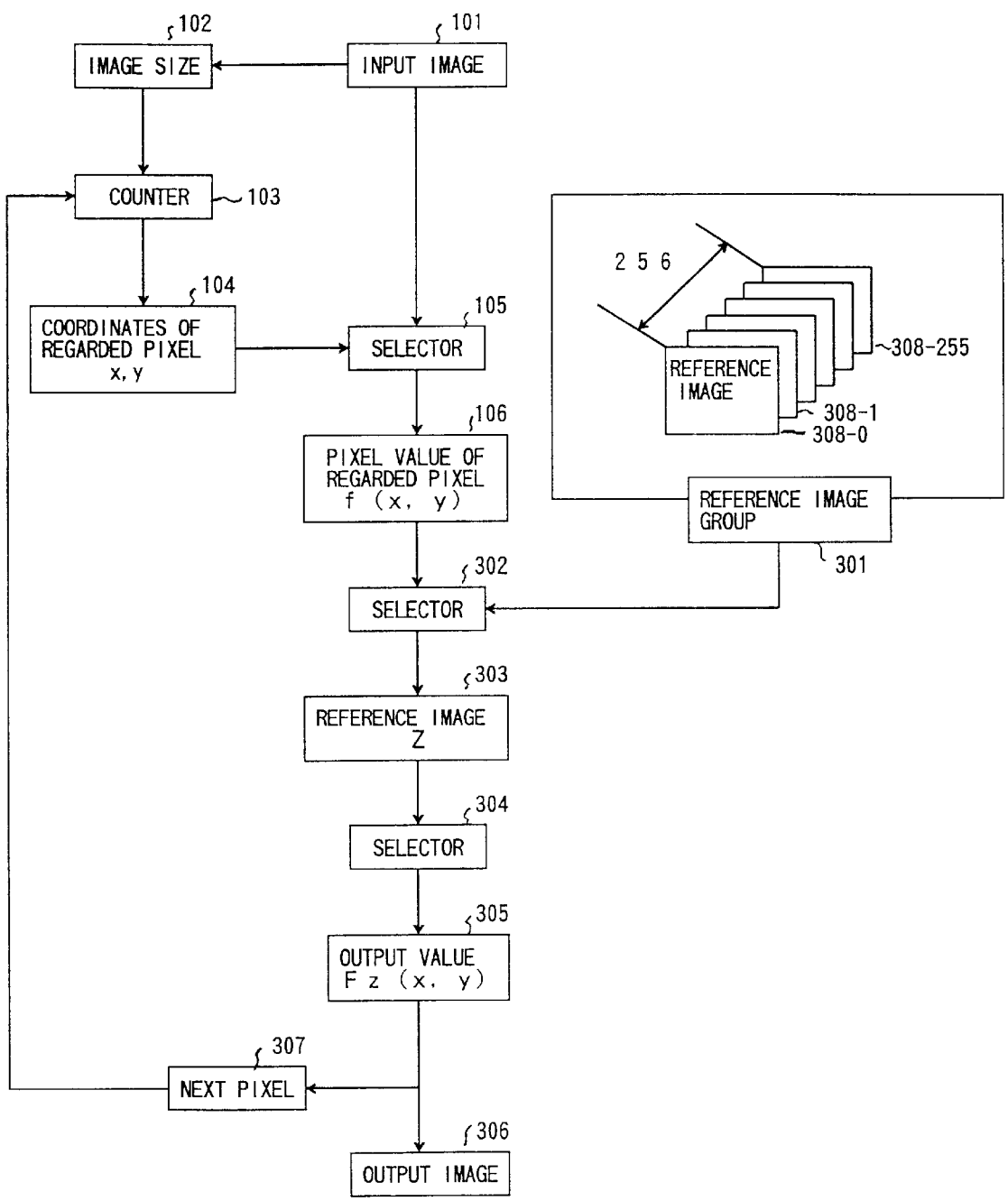

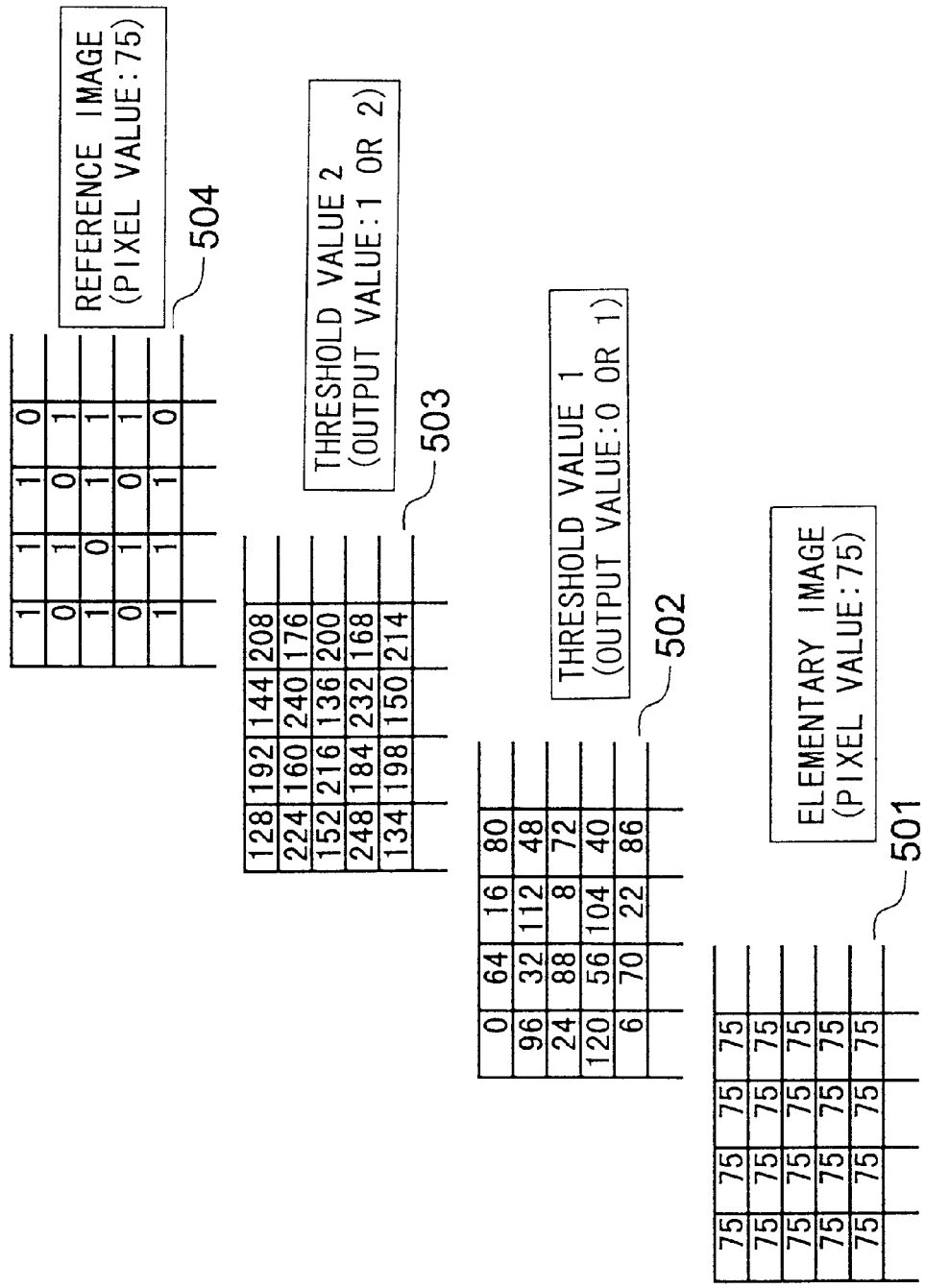

IMAGE WITH TEXTURE

IMAGE WITHOUT TEXTURE

701

$f(x, y) < B$

702

$f(x, y) = B$

703

$f(x, y) > B$

IMAGE WITHOUT TEXTURE

IMAGE WITH TEXTURE

FIG.11A
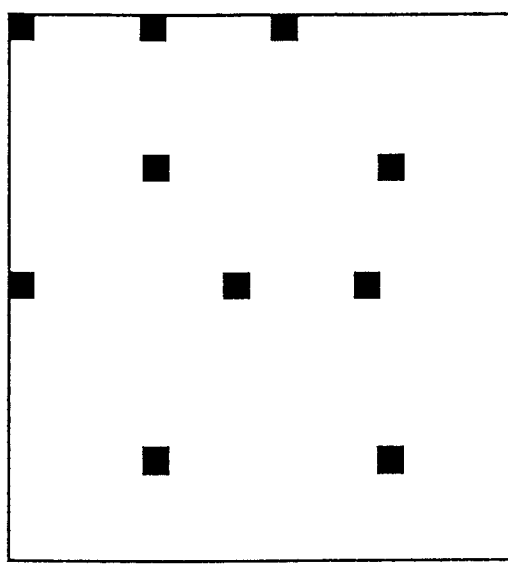
FIG.11B
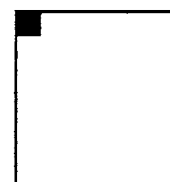
1001 REFERENCE IMAGE
1003 REFERENCE IMAGE
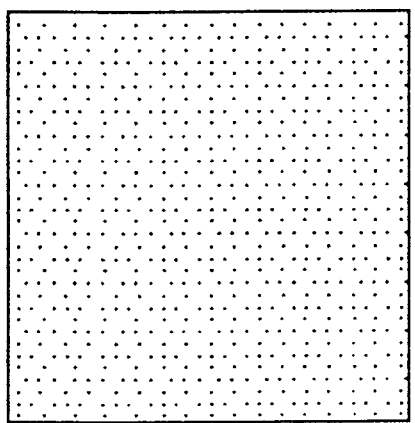
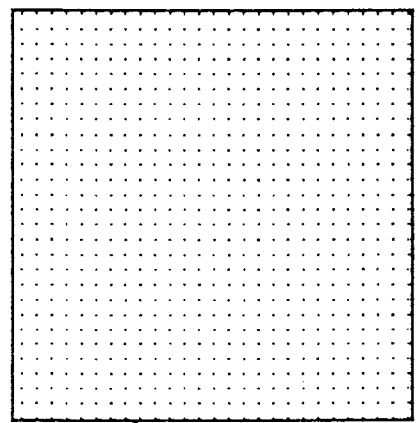
1002 REPEATEDLY USED REFERENCE IMAGE
1004 REPEATEDLY USED REFERENCE IMAGE

GRAY SCALE IMAGE PROCESSING APPARATUS AND GRAY SCALE IMAGE PROCESSING METHOD THEREFOR

BACKGROUND OF THE INVENTION

1. Field of the Invention

The present invention generally relates to a printing method for printing an image and a plurality of characters by means of a printer, a copier, a fax and so on, and more particularly to a gray scale image processing apparatus and a gray scale image processing method therefor, in which a texture in an output image is eliminated.

2. Description of the Related Art

In the field of the printer, the copier, the fax and so on, images which are usually processed are not only binary images but also gray scale images. However, the copier, the fax and so on usually output an image which has a smaller number of gray scale levels than that of an input image. For example, the input image having 256 levels is often printed as a binary image. Therefore, for example, a dither method or a tone production method by density pattern is often used to represent the gray scale image.

In the dither method, one printing pixel is assigned to correspond to one pixel of the input image. On the other hand, in the tone production method by density pattern, many printing pixels are assigned to correspond to one pixel of the input image so that the input image size is substantially enlarged. Therefore, the output image size is larger than the input image size. This is a disadvantage for the gray scale processing apparatus.

FIG. 1 shows a gray scale image processing for a binary image printer according to the prior art in which the dither method is used.

First, an image size 102 of the input image 101 is detected. For example, let the coordinates of an upper left point be (0,0), the coordinates of an upper right point be (999,0), the coordinates of a lower left point be (0,999) and the coordinates of a lower right point be (0,0) when a horizontal size of the input image is 1000 pixels and a vertical size of the input image is 1000 pixels. Next, a pixel number is designated by a counter 103. Next, coordinates 104 (x,y) of the designated pixel by the counter 103 is determined, such that, for example, coordinates (0,0) are designated when the output number of the counter 103 is 0, coordinates (999,0) are designated when the output number of the counter 103 is 999 and coordinates (0,1) are designated when the output number of the counter 103 is 1000. Next, a selector 105 selects one pixel from the input image 101. This pixel is referred to as a regarded pixel. Next, a value 106 f(x,y) of the regarded pixel of the input image 101 is determined. Then, a selector 108 compares the value 106 f(x,y) of the regarded pixel with a corresponding threshold level in a dither matrix 107. If the corresponding threshold level is larger than the value 106 f(x,y), the selector 108 outputs zero. Otherwise, the selector outputs one. An output value 109 Fz(x,y) is a gray scale value of the pixel at a corresponding position of the coordinates 104 (x,y) in an output image 110. Next, if the coordinates 104 (x,y) of the output pixel 109 Fz(x,y) is within an input image size 102, the counter 103 is incremented by an instruction 111 to process a next pixel. Then, a next regarded pixel is processed as mentioned above until all the pixels of the input image is processed.

However, the gray scale processing method as mentioned above has a following problem.

FIGS. 2A, 2B and 2C show examples of arrangements of dots of the output image according to the prior art, which causes the problem. In the prior art, if the pixel value f(x,y) at the coordinates (x,y) of the input image is less than a threshold B, the dot of the output image is placed as shown in FIG. 2A irrespective of the pixel value f(x,y). If the pixel value f(x,y) at the coordinates (x,y) of the input image is equal to the threshold B, the dots of the output image are placed as shown in FIG. 2B. If the pixel value f(x,y) at the coordinates (x,y) of the input image is larger than the threshold B, the dots of the output image are placed as shown in FIG. 2C irrespective of the pixel value f(x,y). Therefore, if the regarded pixel value is less than the threshold value in the dither matrix, the dot of the output image is placed in the same arrangement irrespective of the pixel value and if the regarded pixel value is larger than the threshold value in the dither matrix, the dots of the output image are also placed in the same arrangement irrespective of the pixel value. This means that the arrangement of the dots can not be changed based on the pixel value. As a result, a texture corresponding to the dither matrix in the output image will appear because the arrangement of the dots is fixed according to the threshold in the dither matrix.

SUMMARY OF THE INVENTION

It is a general object of the present invention to provide a gray scale image processing apparatus and a gray scale image processing method therefor, in which the above disadvantages are eliminated.

A more specific object of the present invention is to provide a gray scale image processing apparatus and a gray scale image processing method therefor, in which a texture in an output image is eliminated.

The above objects of the present invention are achieved by a gray scale image processing method which converts an input image, each pixel of which has a value between 0 and N, to an output image, each pixel of which is represented by a gray scale value of A levels. The method has a generation step of generating B reference images, in each of which each pixel is represented by a gray scale value of the A levels, from B elementary images, in each of which all pixels have the same value between 0 and N, using one or more different error distribution matrixes according to said A levels, a selection step of selecting one of the B reference images based on a pixel value f(x,y) of the input image at coordinates (x,y) and an output step of outputting a pixel value represented by a gray scale value of the A levels of the selected one of the B reference images at a position corresponding to the coordinates (x,y).

According to the invention, it is possible to change the arrangement of the dots according to the pixel value of the input image because the reference image can be generated without any restriction and gray scale values of the reference image can be output according to the pixel value of the input image.

BRIEF DESCRIPTION OF THE DRAWINGS

Other objects, features and advantages of the present invention will become more apparent from the following detailed description when read in conjunction with the accompanying drawings, in which:

FIG. 3 shows an embodiment of a gray scale image processing according to the present invention;

FIG. 5 shows an embodiment of a generation method of the reference image using the dither method according to the present invention;

FIGS. 11A and 11B show an embodiment in which the reference image size is changed;

DESCRIPTION OF THE PREFERRED EMBODIMENTS

Figure 1:
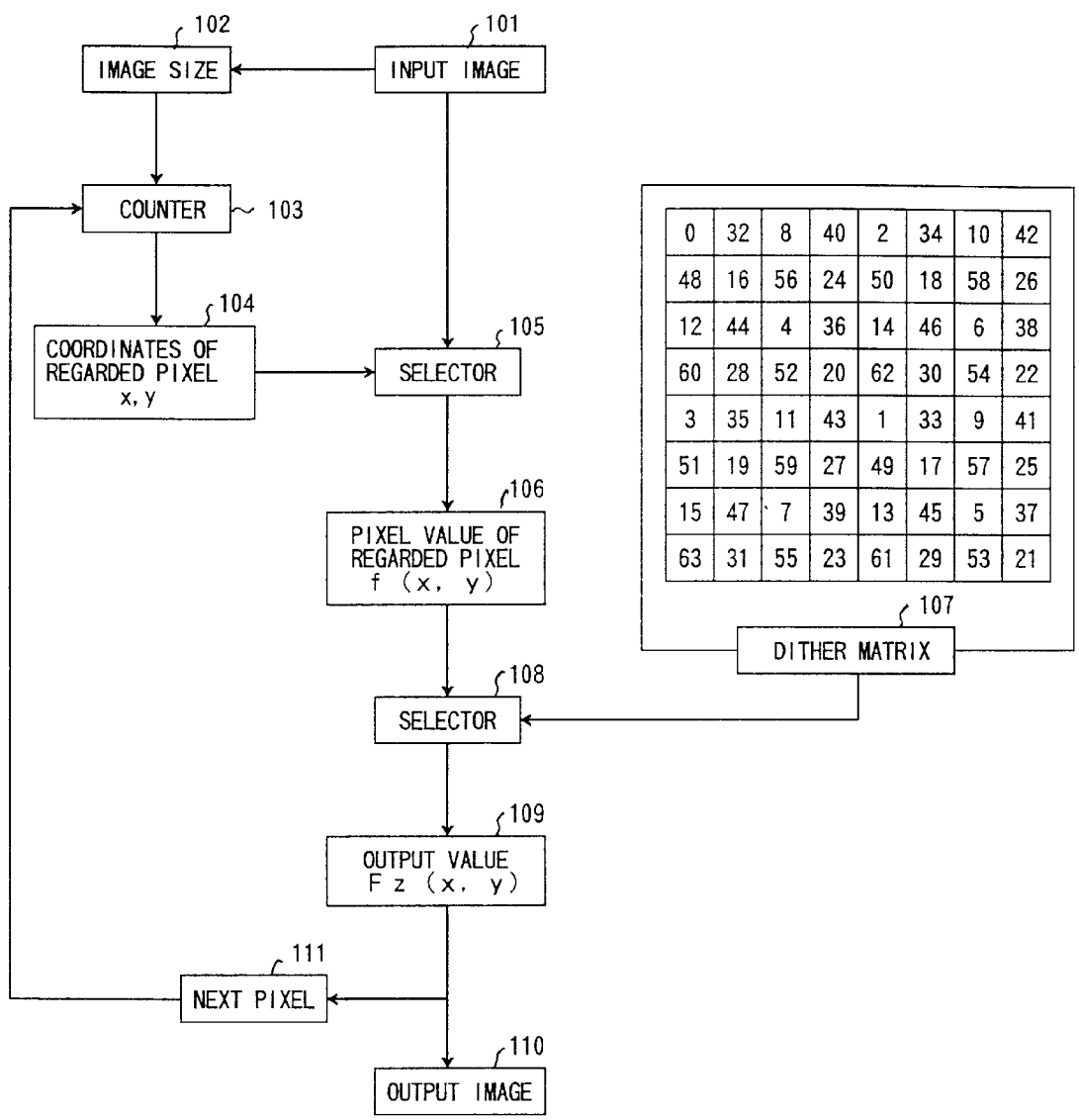
FIG. 1 shows a gray scale image processing for a binary image printer according to the prior art.

A first embodiment according to the present invention will be explained.

FIG. 3 shows an outline of a gray scale image processing according to the present invention. In this embodiment, an output image is a ternary (0,1,2) level image and an input image is a 256 level image.

First, an image size 102 of the input image 101 is detected. For example, let the coordinates of an upper left point be (0,0), the coordinates of an upper right point be (999,0), v coordinates of a lower left point be (0,999) and the coordinates of a lower right point be (0,0) when a horizontal size of the input image is 1000 pixels and a vertical size of the input image is 1000 pixels. Next, a pixel number is designated by a counter 103. Next, coordinates 104 (x,y) of the designated pixel by the counter 103 is determined, such that, for example, coordinates (0,0) are designated when the output number of the counter 103 is 0, coordinates (999,0) are designated when the output number of the counter 103 is 999 and coordinates (0,1) are designated when the output number of the counter 103 is 1000. Next, a selector 105 selects one pixel from the input image 101. This pixel is referred to as a regarded pixel. Next, a value 106 f(x,y) of the regarded pixel of the input image 101 is determined.

Next, a selector 302 selects one of reference images 308-0 through 308-255 in a reference image group 301 which corresponds to the pixel value 106 f(x,y). Each of the reference images 308-0 to 308-255 correspond to 256 pixel values used in the input image 101 and is represented with "A" gray levels. In this embodiment, a number of gray levels "A" is three. For example, an elementary image having pixels all of which have the same value between 0 and 255 is converted to one reference image having pixels with ternary levels. The ternary level reference image represents the image having pixels all of which have the same value between 0 and 255 by means of its pattern. All of "B" elementary images, where "B" is 256 in this embodiment, are converted to 256 ternary level reference images. In this embodiment, it is possible to generate the pattern in which a texture in the reference image is eliminated without any restrictions. The input image is converted to a ternary level output image by means of the reference images 308-0 through 308-255. In this embodiment, the reference image group 301 has the 256 reference images 308-0 through 308-255.

The reference image Z in the reference group 301 corresponding to the value of the regarded pixel 106, which is selected by the selector 302, is supplied to a selector 304. The selector 304 selects a gray scale value (0, 1 or 2) in the reference image Z at a corresponding position (x,y) of the regarded pixel in the input image 101. An output value 305 Fz(x,y) is the gray scale value of the reference image Z corresponding to the value of the regarded pixel 106 at the position (x,y) of the regarded pixel in the input image 101. The output value 305 Fz(x,y) is a gray scale value of the pixel at the position (x,y) in the output image 306. Next, if the coordinates 104 (x,y) of the output pixel 305 Fz(x,y) is within the input image size 102, the counter 103 is incremented by an instruction 307 to process a next pixel. Then, a next regarded pixel is processed as mentioned above until all the pixels of the input image are processed.

As mentioned above, in this embodiment, it is possible to generate the reference image having the pattern in which a texture is eliminated without any restrictions and the reference image having this pattern corresponding to the value of the regarded pixel can be selected when the input image is processed. Therefore, it is possible to use the reference image having the different dot pattern according to the regarded pixel value of the input image. As a result, the problem of the prior art, such that if the regarded pixel value is less than the threshold value in the dither matrix, the dots of the output image are placed in the same arrangement irrespective of the pixel value and if the regarded pixel value is larger than the threshold value in the dither matrix, the dots of the output image are also placed in the same arrangement irrespective of the pixel value, is eliminated. Therefore, the texture in the output image can be eliminated after this gray scale processing is executed.

Figure 4:
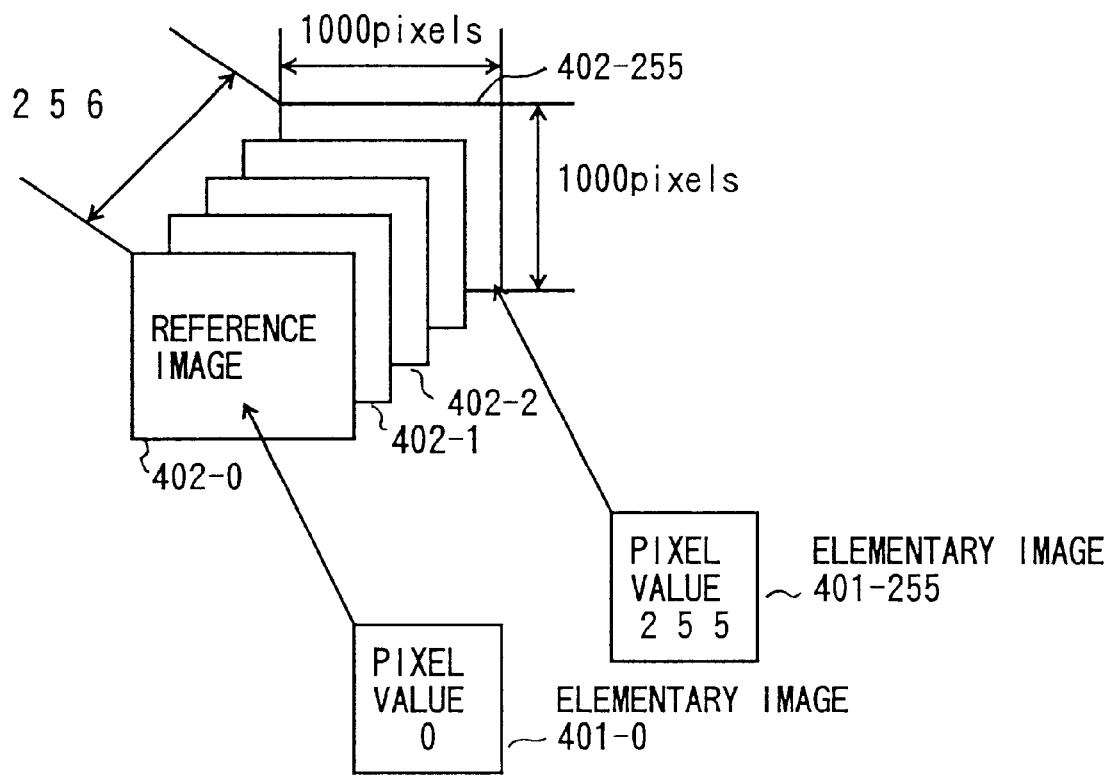
FIG. 4 shows an embodiment of a construction of a reference image group according to the present invention.

Next, an embodiment of a construction of a reference image group according to the present invention will be explained. FIG. 4 shows the embodiment of the construction of the reference image group 301 as shown in FIG. 3 according to the present invention. In the embodiment, a pixel value is represented by 8 bits. Therefore, the pixel can have one of 256 values from 0 through 255. A reference image 402-0 is generated based on an elementary image 401-0 having pixels all of which have the value of 0, and its horizontal size is 1000 pixels and its vertical size is 1000 pixels. A reference image 402-255 is generated based on an elementary image 401-255 having pixels all of which have the value of 255, and its horizontal size is 1000 pixels and its vertical size is 1000 pixels. As described above, the reference image group has the 256 reference images 402-0 through 402-255, each of which corresponds to the pixel value of each elementary image.

Next, an embodiment of a generation method for generating the reference image as shown in FIG. 4 using the dither method according to the present invention will be explained. FIG. 5 shows the embodiment of a generation method for generating the reference image using the dither method according to the present invention, which reference image is used when the input image is converted to the ternary (0,1,2) level output image. An elementary image 501 has the pixels all of which have the value of 75, and its horizontal size is 1000 pixels and its vertical size is 1000 pixels. The elementary image is converted to a reference image 504 using a threshold matrix 502 and a threshold matrix 503. The threshold matrix 502 has threshold values which are used to decide whether the pixel value in the elementary image at a corresponding position of each threshold value is to be assigned to 0 or 1. The threshold matrix 503 has threshold values which are used to decide whether the pixel value in the elementary image at a corresponding position of each threshold value is to be assigned to 1 or 2. For example, each threshold matrix is constructed using a 16×16 Bayer matrix.

First, a value of a pixel in the elementary image 501 is compared with a threshold value in the threshold matrix 502 at a corresponding position to the pixel in the elementary image 501. If the value of the pixel in the elementary image 501 is less than the threshold value in the threshold matrix 502, a gray scale value of 0 is assigned. Otherwise, the gray scale value of 1 is assigned. Next, the value of the pixel in the elementary image 501 is also compared with a threshold value in the threshold matrix 503 at a corresponding position to the pixel in the elementary image 501. If the value of the pixel in the elementary image 501 is less than the threshold value in the threshold matrix 503, a gray scale value of 1 is assigned. Otherwise, the gray scale value of 2 is assigned Two kinds of gray scale values, one is decided using the threshold matrix 502 and another is decided using the threshold matrix 503, are assigned to each pixel in the elementary image 501. When the gray scale value decided using the threshold matrix 502 is 0, the gray scale value in the reference image 504 at the corresponding position of the pixel in the elementary image 501 is 0. When the gray scale value decided using the threshold matrix 502 is 1 and the gray scale value decided using the threshold matrix 503 is 1, the gray scale value in the reference image 504 at the corresponding position of the pixel in the elementary image 501 is 1. When the gray scale value decided using the threshold matrix 503 is 2, the gray scale value in the reference image 504 at the corresponding position of the pixel in the elementary image 501 is 2. As described above, one of ternary (0,1,2) levels is assigned to one pixel in the reference image 504 at the corresponding position to the pixel in the elementary image 501. As a result, one reference image 504 is generated after all pixels in the elementary image 501 having the horizontal size of 1000 pixels and the vertical size of 1000 pixels are processed. Furthermore, the reference image group having the 256 reference images is generated after the 256 elementary images, in each of which all pixels have the same pixel value between 0 and 255, are processed.

Figure 6A:
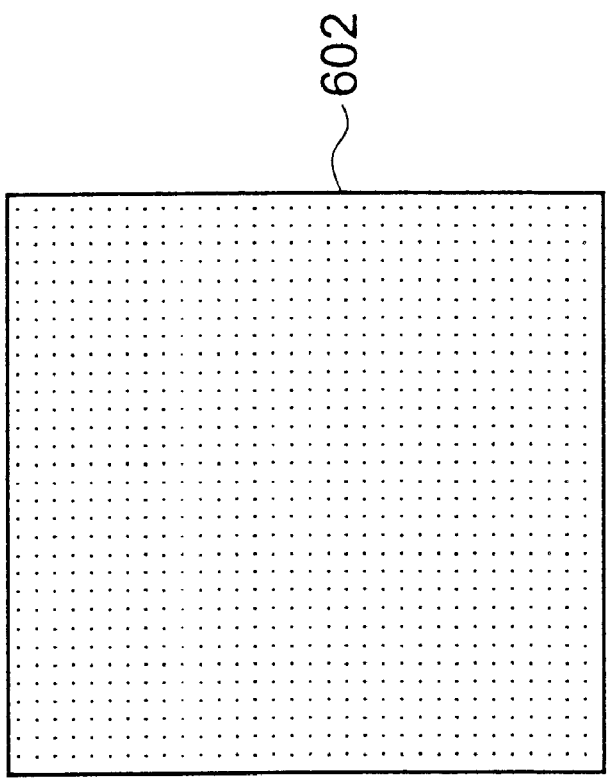
FIG. 6A shows an example of the reference image with a texture.
Figure 6B:
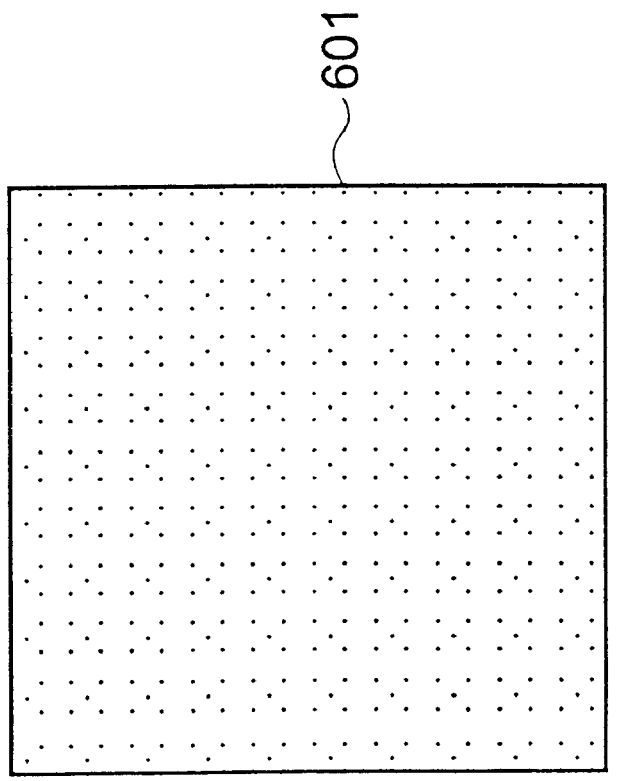
FIG. 6B shows an example of the reference image without a texture.

Next, each reference image is tested as to whether there is a texture on it. FIG. 6A shows an example of the reference image 601 having a texture on it. FIG. 6B shows another example of the reference image 602 without a texture. If the reference image has the texture as shown in FIG. 6A, the threshold matrix 502 or the threshold matrix 503 is changed to such as a 32×32 Bayer matrix or a 16×16 Screw matrix, and the reference image is regenerated from the elementary image using the modified threshold matrixes 502 and 503. The regeneration of the reference image is repeated until the texture on the reference image is eliminated. As a result, the reference image without the texture can be obtained.

Figure 2A:
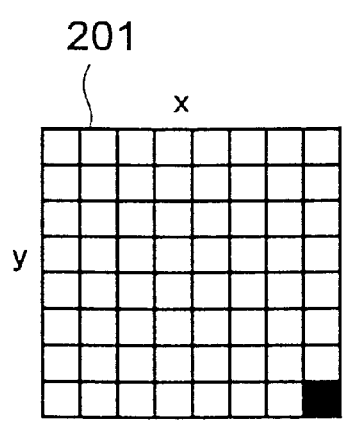
FIGS. 2A, 2B and 2C show examples of arrangements of dots of the output image according to the prior art.
Figure 2B:
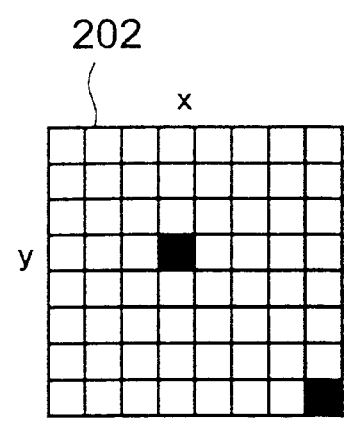
Figure 2C:
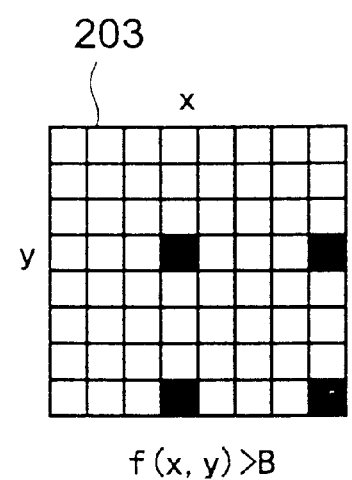
Figure 7A:
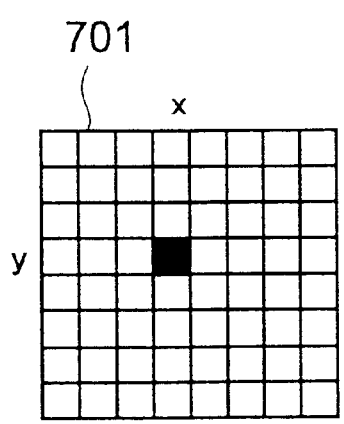
FIGS. 7A, 7B and 7C show embodiments of arrangements of dots of the reference image according to the present invention.
Figure 7B:
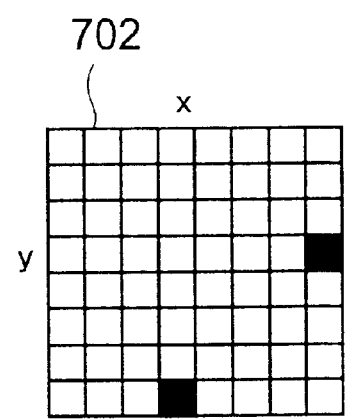
Figure 7C:
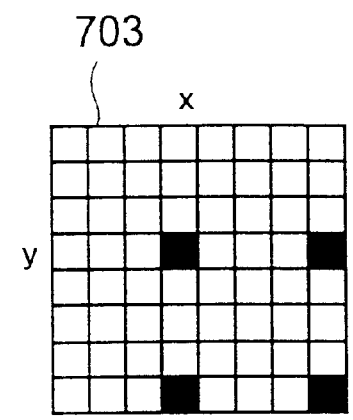
Figure 8B:
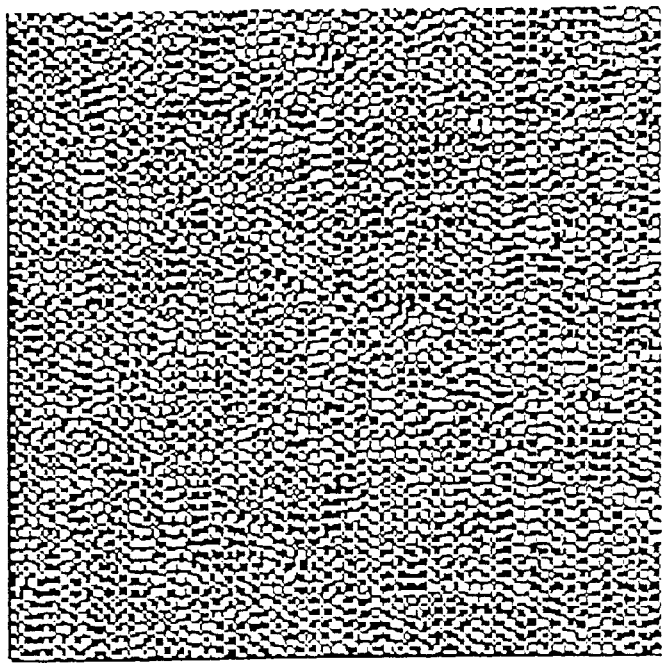
FIGS. 8A and 8B show an embodiment of the reference image according to the present invention.
Figure 8A:
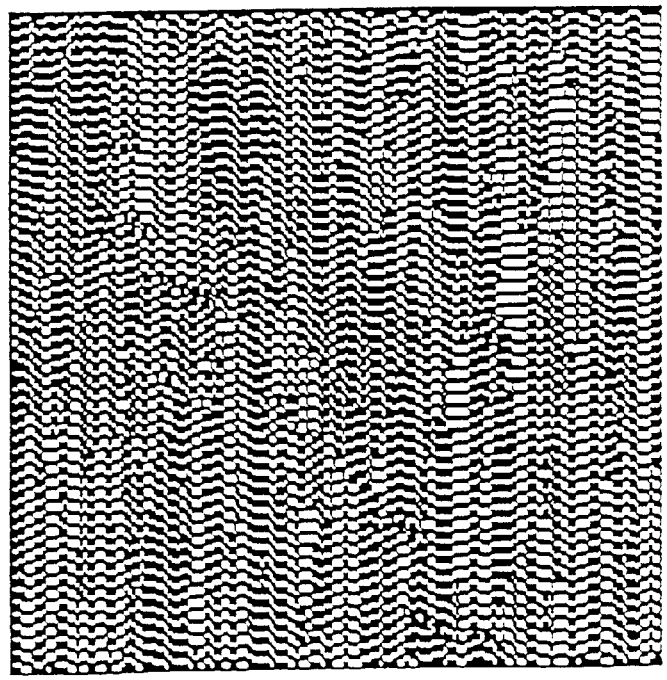

FIGS. 7A,7B and 7C show embodiments of arrangements of dots of the reference image according to the present invention. As mentioned above, the problem of the prior art as shown in FIG. 2, such that if the regarded pixel value is less than the threshold value in the dither matrix, the dots of the output image are placed in the same arrangement irrespective of the pixel value and if the regarded pixel value is larger than the threshold value in the dither matrix, the dots of the output image are also placed in the same arrangement irrespective of the pixel value, is eliminated as shown in FIG. 7A, FIG. 7B and FIG. 7C because it is possible to generate the reference image having the pattern in which a texture is eliminated without any restrictions. Therefore, the texture in the output image can be eliminated after the gray scale processing according to the present invention is executed. FIG. 8A and FIG. 8B show an embodiment of the reference images according to the present invention. FIG. 8A shows the reference image 801 having the texture such as a worm pattern. FIG. 8B shows the reference image 802 in which the texture is eliminated. The reference image 802 without the texture can be obtained according to the repetition process as mentioned above.

Next, a second embodiment according to the present invention will be explained.

Figure 9:
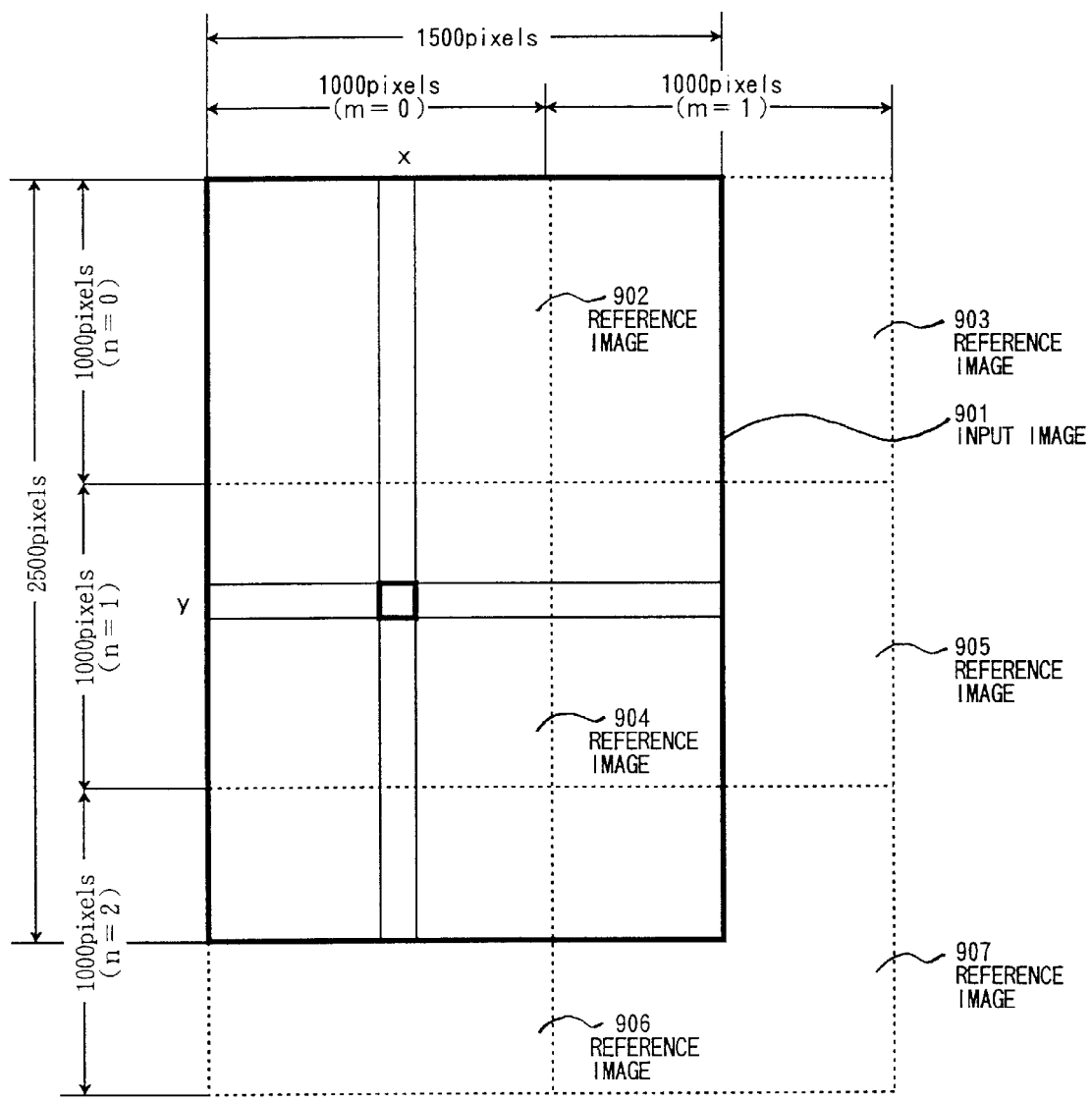
FIG. 9 shows an embodiment of a processing method when the input image size is larger than a reference image size.
Figure 10:
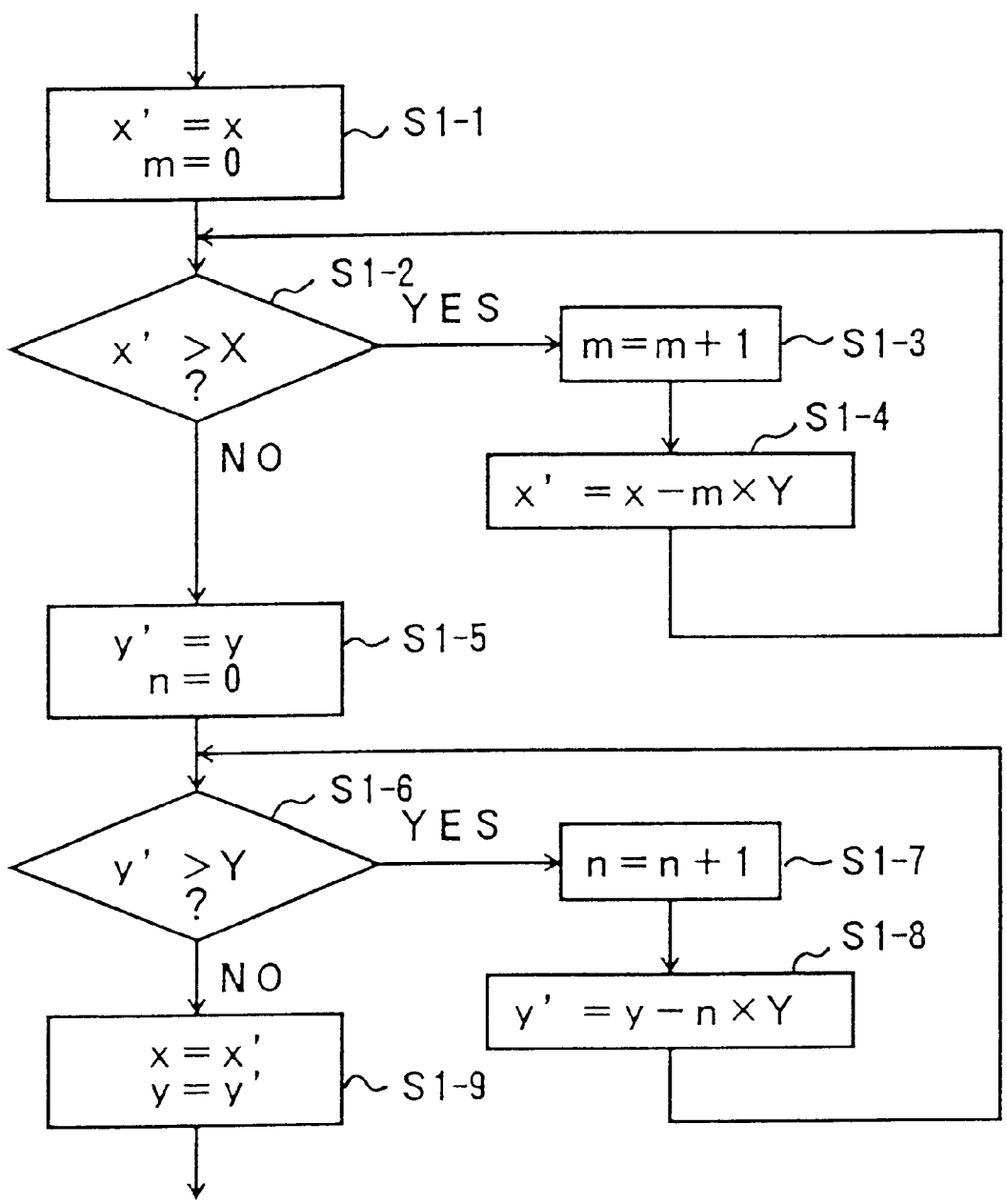
FIG. 10 shows a flow chart of the processing when the input image size is larger than the reference image size.

FIG. 9 shows an embodiment of a gray scale image processing method when the input image size is larger than the reference image size. For example, in this embodiment, the horizontal size of the input image 901 is 1500 pixels and the vertical size of it is 2500 pixels. On the other hand, for example, the horizontal size X of the reference image 902 is 1000 pixels and the vertical size Y of it is 1000 pixels. FIG. 10 shows a flow chart of the processing method when the input image size is larger than the reference image size. The algorithm for selecting the output gray scale value at coordinates corresponding to coordinates (x,y)=(800,1200) of the regarded pixel in the input image will be explained.

At a step S1-1 in FIG. 10, an initialization is done. At the step S1-1, x' is assigned to x (x'=x) and m is assigned to 0 (m=0), where x' is a horizontal coordinate after an operation is executed, and m is a horizontal repetition number. Then, the operation is started. At a step S1-2, the operation is proceeded to a step S1-5 because x'=800 is less than X which is the horizontal size of the reference image 902 having a value of 1000. If the horizontal coordinate x of the regarded pixel is larger than X=1000, one is added to m at a step S1-3 and x' is set a value x−1000×m at a step S1-4, then, the same decision is made at the step S1-2 as mentioned above. At a step S1-5 in FIG. 10, an initialization is done. At the step S1-5, y' is assigned to y (y'=y) and n is assigned to 0 (n=0), where y' is a vertical coordinate after operation, and n is a vertical repetition number. Then the operation is continued. At a step S1-6, y'=1200 is larger than Y which is the vertical size of the reference image 902 having a value of 1000. Therefore, one is added to the n at a step S1-7 and y' is set a value y−1000×n which is equal to 200 at a step S1-8. Then, the same decision is made at the step S1-6 using the new y' which is equal to 200 as mentioned above. As a result, new coordinates (x', y') is obtained at a step S1-9. This new coordinates (x', y') is used in place of the coordinates (x, y) of the regarded pixel of the input image to select the output gray scale value from the reference image Z. The selector 304 as shown in FIG. 3 selects the output gray scale value from the reference image Z using the new coordinates (x', y') in place of the coordinates (x, y) of the regarded pixel of the input image. In this embodiment according to the present invention, it is possible to selects the output gray scale value from the reference image Z which is selected according to the regarded pixel value of the input image, when the input image size is larger than the reference image size. Therefore, the texture in the output image can be eliminated after this gray scale processing is executed because it is possible to use the reference image having the dot pattern generated without restriction according to the present invention.

Next, an embodiment of a construction of a reference image according to the present invention will be explained. FIG. 11A shows one reference image 1001 in the reference image group in which each reference image has the same size. When the reference image 1001 is used repeatedly to process the input image as shown in FIG. 9, the texture may appear on a reference image 1002 which is a repeated expansion of the reference image 1001 as shown in FIG. 11A even if the reference image 1001 does not have the texture on it. In this case, it is possible to eliminate the texture on the repeatedly expanded reference image 1002 by constructing the reference image group having the reference images each of which has an optimal image size. FIG. 11B shows an embodiment of the reference image 1003 in the reference image group in which each reference image has the optimal image size. Especially, the reference image 1003 as shown in FIG. 11B is smaller than the size of the reference image 1001. As a result, the texture on the reference image 1004 which is a repeated expansion of the reference image 1003 as shown in FIG. 11B can be eliminated.

Furthermore, it is possible to reduce a memory area for storing the reference image group in an apparatus according to the present invention because the sizes of some reference images in the reference images group can be reduced.

In this embodiment according to the present invention, it is also possible to selects the output gray scale value from the reference image which is selected according to the regarded pixel value of the input image using the reference image repeatedly as shown in FIG. 9, when the input image size is larger than the reference image size.

Next, a third embodiment according to the present invention will be explained.

Figure 12:
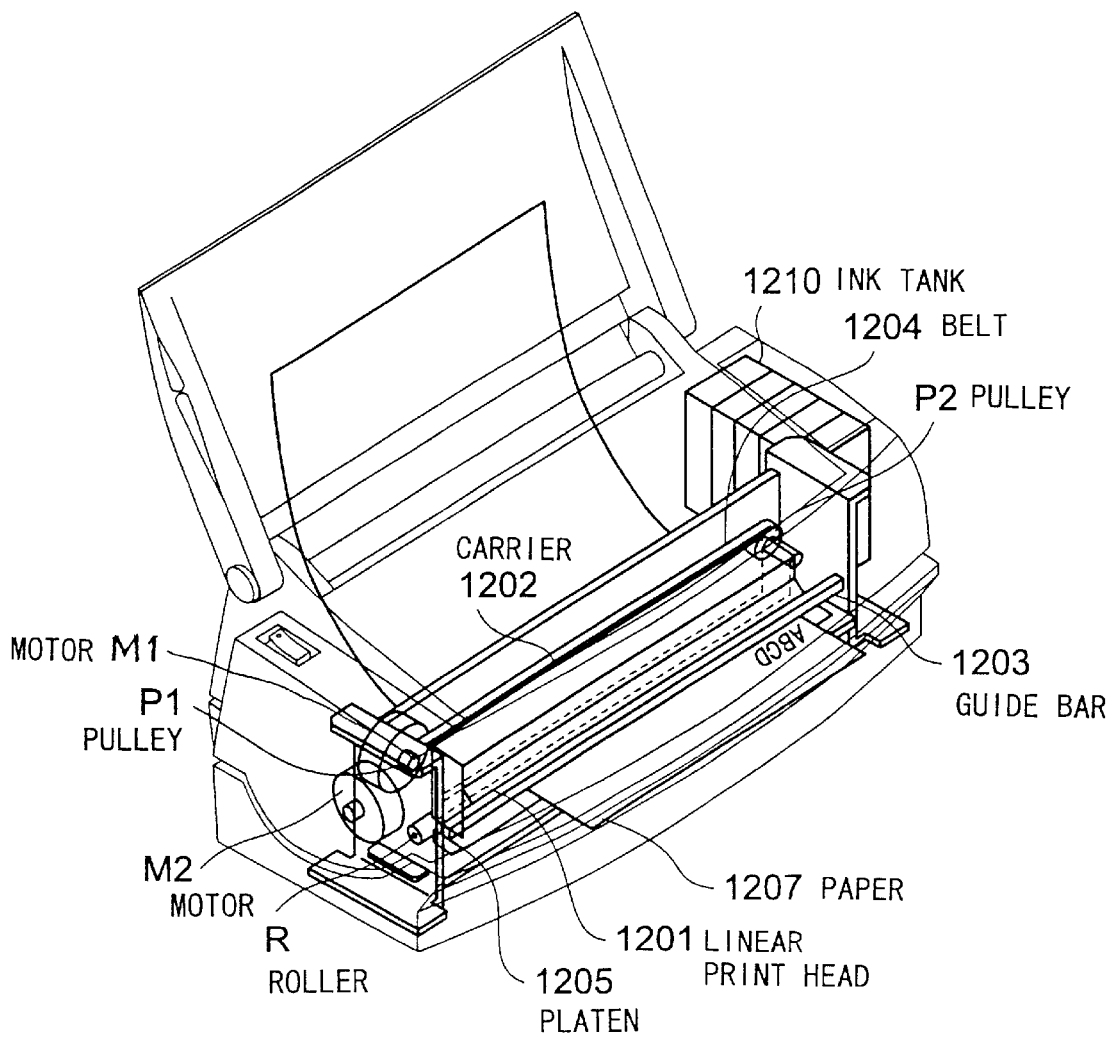
FIG. 12 shows an embodiment of a printer according to the present invention.

FIG. 12 shows an embodiment of a printing apparatus such as an ink-jet printer according to the present invention. In the printer, a paper 1207 is being printed by a linear print head 1201 while the paper 1207 is being moved by a roller R driven by a motor M2. When the linear print head 1201 is printing, the linear print head 1201 and an ink tank 1210 are being moved by a belt 1204 driven by a pulley P2 and a motor M1. The printer is usually controlled by a controller, such as a personal computer.

Figure 13:
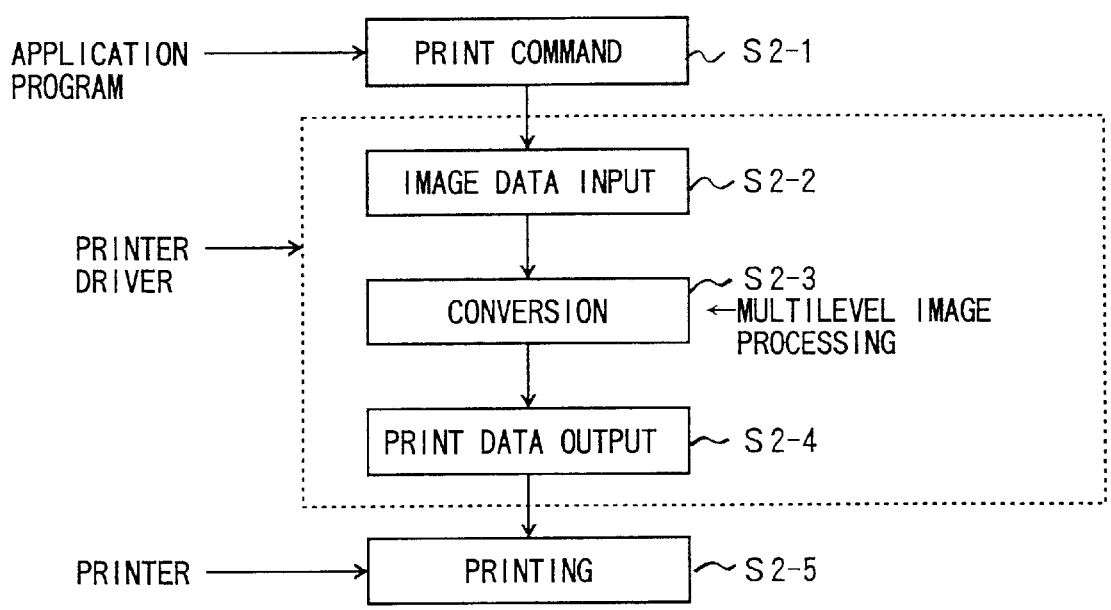
FIG. 13 shows a flow of print data to the printer.

FIG. 13 shows a flow of print data from an application program through a printer driver software to the printer. The personal computer controls the printer by means of the data. The application program issues a print command with the print data at a step S2-1. The print command and the print data are supplied to the printer driver software. The printer driver software receives the print command and the print data at a step S2-2. Next, a format of the received print data is converted to another format of the data which can be handled by the printer at a step S2-3. The gray scale image processing according to the present invention is used in the format conversion at the step S2-3. Then, the processed print data is output to the printer at a step S2-4 and the data is printed by the printer at a step S2-5.

The printer in which the gray scale image processing method according to the present invention is used can print the image without the texture on the paper.

The present invention is not limited to the specifically disclosed embodiments, and variations and modifications may be made without departing from the scope of the present invention.

The present application is based on Japanese priority application No. 11-116821 filed on Apr. 23, 1999, the entire contents of which are hereby incorporated by reference.

What is claimed is:

1. A gray scale image processing method which converts an input image, each pixel of which has a value between 0 and N, to an output image, each pixel of which is represented by a gray scale value of A levels, comprising:
    a generation step of generating B reference images, in each of which each pixel is represented by a gray scale value of said A levels, from B elementary images, in each of which all pixels have the same value between 0 and N, using one or more different error distribution matrixes according to said A levels;
    a selection step of selecting one of said B reference images based on a pixel value f(x,y) of said input image at coordinates (x,y); and
    an output step of outputting a pixel value represented by a gray scale value of said A levels of said selected one of said B reference images at a position corresponding to said coordinates (x,y).

2. A gray scale image processing method as claimed in claim 1, wherein each size of said B reference images is larger than a size of said input image.

3. A gray scale image processing method as claimed in claim 1, wherein said B reference images, in each of which each pixel is represented by a gray scale value of said A levels, are generated from said B elementary images using a system dither method with one or more different dither matrixes according to said A levels.

4. A gray scale image processing method as claimed in claim 2, wherein said B reference images, in each of which each pixel is represented by a gray scale value of said A levels, are generated from said B elementary images using a system dither method with one or more different dither matrixes according to said A levels.

5. A gray scale image processing method as claimed in claim 1, wherein said B reference images are generated from said B elementary images, such that said B elementary images are processed using an error distribution method according to said A levels and a part without a texture is extracted from each processed image of said B elementary images as each of said B reference images.

6. A gray scale image processing method as claimed in claim 2, wherein said B reference images are generated from said B elementary images, such that said B elementary images are processed using an error distribution method according to said A levels and a part without a texture is extracted from each processed image of said B elementary images as each of said B reference images.

7. A gray scale image processing method as claimed in claim 1, wherein if a size of said input image is larger than each size of said B reference images, each of said B reference images is repeatedly used to convert said input image to said output image.

8. A gray scale image processing method as claimed in claim 3, wherein if a size of said input image is larger than each size of said B reference images, each of said B reference images is repeatedly used to convert said input image to said output image.

9. A gray scale image processing method as claimed in claim 5, wherein if a size of said input image is larger than each size of said B reference images, each of said B reference images is repeatedly used to convert said input image to said output image.

10. A gray scale image processing method as claimed in claim 1, wherein each size of said B reference images has an arbitrary size.

11. A gray scale image processing method as claimed in claim 2, wherein each size of said B reference images has an arbitrary size.

12. An output apparatus which supplies said output image processed by said gray scale image processing method as claimed in claim 1.

13. An output apparatus which supplies said output image processed by said gray scale image processing method as claimed in claim 2.

14. An output apparatus which supplies said output image processed by said gray scale image processing method as claimed in claim 3.

15. An output apparatus which supplies said output image processed by said gray scale image processing method as claimed in claim 4.

16. An output apparatus which supplies said output image processed by said gray scale image processing method as claimed in claim 5.

17. An output apparatus which supplies said output image processed by said gray scale image processing method as claimed in claim 6.

18. An output apparatus which supplies said output image processed by said gray scale image processing method as claimed in claim 7.

19. An output apparatus which supplies said output image processed by said gray scale image processing method as claimed in claim 8.

20. An output apparatus which supplies said output image processed by said gray scale image processing method as claimed in claim 9.

21. An output apparatus which supplies said output image processed by said gray scale image processing method as claimed in claim 10.

22. An output apparatus which supplies said output image processed by said gray scale image processing method as claimed in claim 11.

23. A gray scale image processing apparatus which converts an input image, each pixel of which has a value between 0 and N, to an output image, each pixel of which is represented by a gray scale value of A levels, comprising:

a generation part for generating B reference images, in each of which each pixel is represented by a gray scale value of said A levels, from B elementary images, in each of which all pixels have the same value between 0 and N, using one or more different error distribution matrixes according to said A levels;

a selection part for selecting one of said B reference images based on a pixel value f(x,y) of said input image at coordinates (x,y); and an output part for outputting a pixel value represented by a gray scale value of said A levels of said selected one of said B reference images at a position corresponding to said coordinates (x,y).

* * * * *